(12) United States Patent
Jendbro et al.

(10) Patent No.: US 7,522,940 B2
(45) Date of Patent: Apr. 21, 2009

(54) METHODS AND MOBILE TERMINALS FOR DISPLAY OF MOBILE TERMINAL DENSITY INFORMATION

(75) Inventors: Magnus Jendbro, Lund (SE); Bjorn Hansson, Malmo (SE); Martin Kretz, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 568 days.

(21) Appl. No.: 10/989,652

(22) Filed: Nov. 16, 2004

(65) Prior Publication Data

US 2006/0105815 A1     May 18, 2006

(51) Int. Cl.
    *H04B 1/38*     (2006.01)
(52) U.S. Cl. .................. 455/566; 455/456.1; 455/457; 455/435.2; 701/211; 709/203; 342/357.1
(58) Field of Classification Search ............. 485/414.1, 485/414.2, 440, 441, 456.1, 456.2; 701/117–119, 701/208, 211, 213; 340/988, 992; 455/404.2, 455/435.1, 435.2, 456.1–456.6, 457, 550.1, 455/552.1, 566; 709/203; 342/357.06, 357.08, 342/357.1, 357.13
See application file for complete search history.

(56) References Cited

U.S. PATENT DOCUMENTS

| | | | |
|---|---|---|---|
| 6,182,010 B1 * | 1/2001 | Berstis | 701/211 |
| 6,236,933 B1 | 5/2001 | Lang | |
| 6,427,113 B1 | 7/2002 | Rahman | |
| 6,526,349 B2 * | 2/2003 | Bullock et al. | 701/209 |
| 6,539,300 B2 | 3/2003 | Myr | |
| 6,567,661 B2 | 5/2003 | McDonnell et al. | |
| 6,594,576 B2 * | 7/2003 | Fan et al. | 701/117 |
| 6,804,524 B1 * | 10/2004 | Vandermeijden | 455/456.1 |
| 6,810,321 B1 * | 10/2004 | Cook | 701/117 |
| 7,188,026 B2 * | 3/2007 | Tzamaloukas | 701/200 |
| 2003/0100317 A1 | 5/2003 | Kaplan et al. | |
| 2003/0134648 A1 | 7/2003 | Reed et al. | |
| 2004/0171390 A1 | 9/2004 | Chitrapu | |
| 2004/0185839 A1 | 9/2004 | Seligmann et al. | |
| 2005/0086004 A1 * | 4/2005 | Smith | 702/3 |
| 2006/0009240 A1 * | 1/2006 | Katz | 455/457 |

FOREIGN PATENT DOCUMENTS

| | | |
|---|---|---|
| DE | 102 37 906 A1 | 4/2003 |
| EP | 1 176 840 | 1/2002 |
| EP | 1 191 802 A2 | 3/2002 |
| JP | 11-223674 | 8/1999 |
| JP | 2002-341053 | 11/2002 |
| JP | 2003-329779 | 11/2003 |
| WO | WO02/27691 A1 | 4/2002 |

OTHER PUBLICATIONS

International Search Report and Written Opinion of the International Searching Authority for International Patent Application No. PCT/EP2005/012170 mailed on Feb. 21, 2006.

* cited by examiner

*Primary Examiner*—Nhan T Le
(74) *Attorney, Agent, or Firm*—Myers Bigel Sibley & Sajovec, P.A.

(57) ABSTRACT

A method of providing information on a mobile terminal can include displaying mobile terminal density information on a mobile terminal display according to a selectable context based on parameters reported by mobile terminals operating in a wireless communications network to a server.

20 Claims, 6 Drawing Sheets

METHODS AND MOBILE TERMINALS FOR DISPLAY OF MOBILE TERMINAL DENSITY INFORMATION

TECHNICAL FIELD OF THE INVENTION

The invention generally relates to the field of electronics and, more particularly, to methods, mobile terminals, and computer program products for electronic communications.

DESCRIPTION OF RELATED ART

It is known to collect environmental parameters, such as weather-related parameters, from mobile terminals operating in a wireless communications network. For example, U.S. Pat. No. 6,567,661 to McDonnell et al. entitled "Distributed Telemetry Method and System" discusses a distributed telemetry method effected by coordinating the taking of readings or a parameter by mobile phone users. The parameter readings can be sent to a service system together with a location of the user. Collating the readings and location information may enable generation of a representation of the geographic variation of the measured parameter (see, for example, the abstract of McDonnell).

It is further known to track in-vehicle cell phones within a given region to provide data for control of a traffic system. For example, U.S. Pat. No. 6,539,300 to Myr entitled "Method for Regional System Wide Optimal Signal Timing for Traffic Control Based on Wireless Phone Networks." discusses obtaining signals from vehicular-based cellular phones to provide location information on the moving vehicles, which are input to an intelligent traffic control system to provide position information. Mathematical models may use the information and digital maps/algorithms to compute actual travel times (see, for example, the abstract of Myr).

Other types of systems are discussed in the following references: EP 1191802; JP 11/223674; JP 2002/341053; JP 2003/329779; U.S. Pat. No. 6,236,933; US 2003/100317; WO 02/27691; U.S. Pat. No. 6,427,113; and DE 10237906. Notwithstanding the material discussed above, there is a need for improved usage of parameters collected from mobile terminals.

SUMMARY

Embodiments according to the invention can provide methods, mobile terminals, and computer program products for display of mobile terminal density information. Pursuant to these embodiments, a method of providing information on a mobile terminal can include displaying mobile terminal density information on a mobile terminal display according to a selectable context based on parameters reported by mobile terminals operating in a wireless communications network to a server.

In some embodiments according to the invention, the method further includes receiving the parameters from the mobile terminals at the server via ad-hoc reporting of the mobile terminals. The parameters can be compiled to provide the mobile terminal density information and the mobile terminal density information can be transmitted to the mobile terminal for display.

In some embodiments according to the invention, the mobile terminal density information can be applied to the selectable context to generate a geographic display associated with the context. In some embodiments according to the invention, the geographic display associated with the context is a map and a plurality of grid of locations overlaid thereon.

In some embodiments according to the invention, the density information further includes velocity information associated with the mobile terminals. Selected ones of the plurality of grid locations can be rendered with color and opacity values based on mobile terminal density information associated with the selected ones of the plurality of grid locations.

In some embodiments according to the invention, a maximum opacity value is less than an opaque value so that the underlying map is visible through the plurality of grid locations overlaid thereon at the maximum opacity value. In some embodiments according to the invention, the color values are a statistical representation of velocity of mobile terminals located in a geographic area serviced by the wireless communications network corresponding to respective grid locations. In some embodiments according to the invention, the opacity values are a statistical representation of a density of mobile terminals located in a geographic area serviced by the wireless communications network corresponding to respective grid locations.

In some embodiments according to the invention, the selectable context is a first selectable context selected from a plurality of selectable contexts, wherein some of the mobile terminal density information is suppressed according to the first selectable context and not suppressed according to a second selectable context.

In some embodiments according to the invention, the selectable context can be a shopping context, a commuting context, and/or an entertainment context. In some embodiments according to the invention, the selectable context comprises a sub-context. In some embodiments according to the invention, the parameters can be location information, velocity information, connectivity information, image/video information and/or audio information.

DETAILED DESCRIPTION OF EMBODIMENTS ACCORDING TO THE INVENTION

The invention is described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second may be used herein to describe various components these components should not be limited by these terms. These terms are only used to distinguish one component from another. Thus, for example, a first component discussed below could be termed a second component without departing from the teachings of the present invention.

The invention is described with reference to a flowchart and block diagrams of mobile terminals, communications networks, and operations thereof according to embodiments of the invention. It will be understood that each block of the flowchart and/or block diagrams, and combinations of blocks, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or schematic block or blocks.

It will be understood, that the invention may be practiced with any mobile terminal that operates in a communications network. A mobile terminal may be, for example, a single or dual mode cellular radiotelephone with or without a multi-line display; a Personal Communications System (PCS) terminal that may combine a cellular radiotelephone with data processing, facsimile and data communications capabilities; a Personal Data Assistant (PDA) that can include a mobile terminal, pager. Internet/intranet access, Web browser, organizer, calendar and/or a global positioning system (GPS) receiver: and a conventional laptop and/or palmtop receiver or other appliance all of which include a transceiver.

It will be understood that mobile terminals according to the invention may operate in any type of wireless communications network. In some embodiments according to the invention, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

Mobile terminals according to the invention may also be used in celestial communications networks, such as satellite communications networks. The celestial wireless communications network may be employed to perform similar functions to those performed by the communications network of FIG. 1. In particular, the celestial wireless communication system typically includes one or more satellites that serve as relays or transponders between one or more earth stations and (satellite) mobile terminals. The satellites typically communicate with the satellite mobile terminals and earth stations via duplex communication links. Each earth station may, in turn, be connected to a Public Switched Telephone Network (PSTN) in a terrestrial communications networks, thereby allowing communications between the satellite mobile terminal, and other devices serviced by the network.

Figure 1:
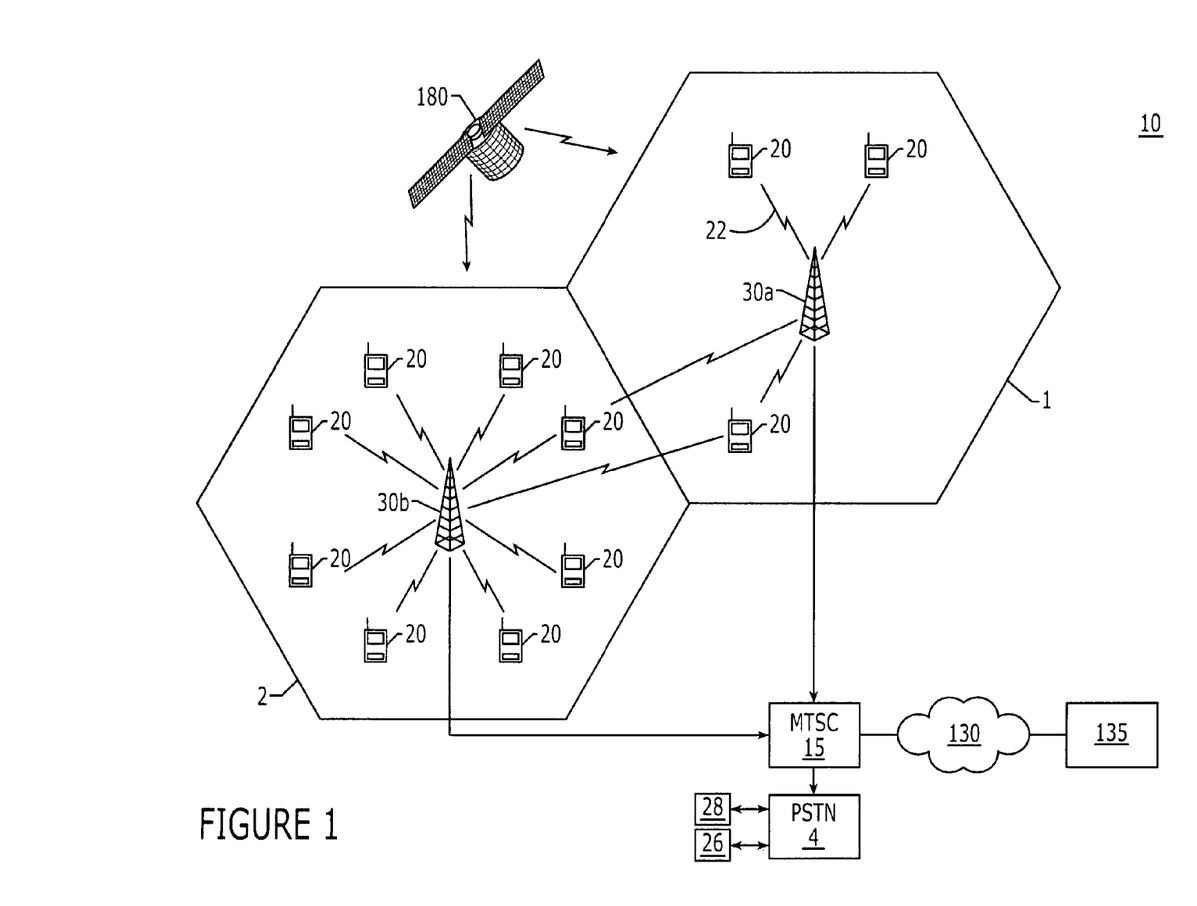
FIG. 1 is a schematic diagram that illustrates embodiments of a wireless communications network providing service to mobile terminals according to some embodiments of the invention.

FIG. 1 is a diagram that illustrates a wireless communications network (hereinafter "network") 10 that supports communications in which mobile terminals 20 according to the invention can be used. Networks 10 are commonly employed to provide voice and data communications to subscribers using, for example, the standards discussed above. According to FIG. 1, a plurality of mobile terminals 20 can communicate with each other and other terminals, such as terminals 26, 28, via the network 10 and a PSTN 14.

The wireless communications network 10 is organized as cells 1-2 that collectively can provide service to a geographic region. In particular, each of the cells can provide service to associated sub-regions included in the geographic region covered by the network 10. More or fewer cells can be included in the network 10, and the coverage area for the cells 1-2 may overlap. Each of the cells 1-2 may include an associated base station 30*a-b*. The base stations 30*a-b* can provide wireless communications between each other and the mobile terminals 20 in the associated geographic region to allow for communications therebetween.

Each of the base stations 30*a-b* can transmit/receive data to/from the mobile terminals 20 over an associated control channel 22. For example, the base station 30*a* in cell 1 can communicate with the mobile terminal 20 over the control channel 22. The control channel 22 can be used, for example, to page the mobile terminal 20 in response to calls directed thereto or to transmit traffic channel assignments to the mobile terminal 20 over which a call associated therewith is to be conducted. The control channels 22 can be identified using control channel numbers or identifiers. For example, the mobile terminal 20 can store a channel number that identifies control channel 22 as the control channel on which it is currently camping. Although only one control channel is illustrated, it will be understood that each of the mobile terminals 20 may have a respective control channel 22 associated therewith.

The mobile terminals 20 are configured to register with the network 10 when, for example, the mobile terminals are turned on. In particular, the mobile terminals use information, stored on a SIM card in the respective mobile terminal, to register with the network 10. Once the mobile terminals 20 are registered with the network 10, the mobile terminals 20 can receive service from the wireless communications network 10, such as placing and receiving calls via the wireless communications network 10 as the mobile terminals 20 move within the geographic region serviced by the network 10.

The mobile terminals 20 may also be capable of sending and receiving messages over the respective control channel 22. In some embodiments according to the invention, the mobile terminals send/receive Short Message Service (SMS)

or Enhanced Message Service (EMS) formatted messages, Multimedia Message Service (MMS), and/or Smartmessaging™ formatted messages. As is known to those skilled in the art, SMS and EMS messages can be transmitted on digital networks, such as GSM networks, allowing relatively small text messages (for example, 160 characters in size) to be sent and received via the network operator's message center to the mobile terminal 20, or from the Internet, using a so-called SMS (or EMS) "gateway" website.

MMS is a messaging system for asynchronous mobile-to-mobile messaging, which enables communication of messages containing "rich media" content, i.e., content of types that tend to be more data-intensive than text, such as such as graphics, digital photographs, video, animation, sound files, and/or audio. MMS is standardized by the WAP Forum and the Third-Generation Partnership Project (3GPP) and is described in: "WAP MMS, Architecture Overview," WAP-205, WAP Forum (Approved Version Apr. 25, 2001); "WAP MMS, Client Transactions Specification," WAP-206, WAP Forum (Approved Version Jan. 15, 2002); "WAP MMS, Encapsulation Specification," WAP-209, WAP Forum (Approved Version Jan. 5, 2002); "Requirements", 3GPP specification 22.140; and "Architecture and Functionality," 3GPP specification 23.140.

WAP has been promulgated to enable application programs to be written to operate on a wide array of wireless communications networks by providing a standard for the presentation and delivery of wireless information and telephony services. As a result, various mobile terminals, such as mobile terminals, pagers, two-way radios, smartphones and communicators can utilize WAP to enable delivery of relevant information and services to mobile terminals.

Accordingly, it will be understood that, as described further herein, the control channels 22 can be used to transmit mobile terminal density information to the mobile terminals 20 as an SMS, MMS, EMS or other type of message via a WAP client. In some embodiments according to the invention, the mobile terminal density information can be provided to the mobile terminals 20 via a "Midlet." As is well known by those skilled in the art, a Midlet is a Java application designed to run on Java enabled devices such as cell phones and PDAs. A Midlet is based on the Java 2 Platform, Micro Edition, using the Connected Limited Device Configuration (CLDC), which defines a set of application programming interfaces and a virtual machine for resource-constrained devices, such as those discussed herein. Midlets are further discussed on the Internet at "www.sun.com." It will be further understood that other information, such as maps and other dynamic graphical data may also be transmitted in a suitable message, including any or all of the above message types.

Figure 2:
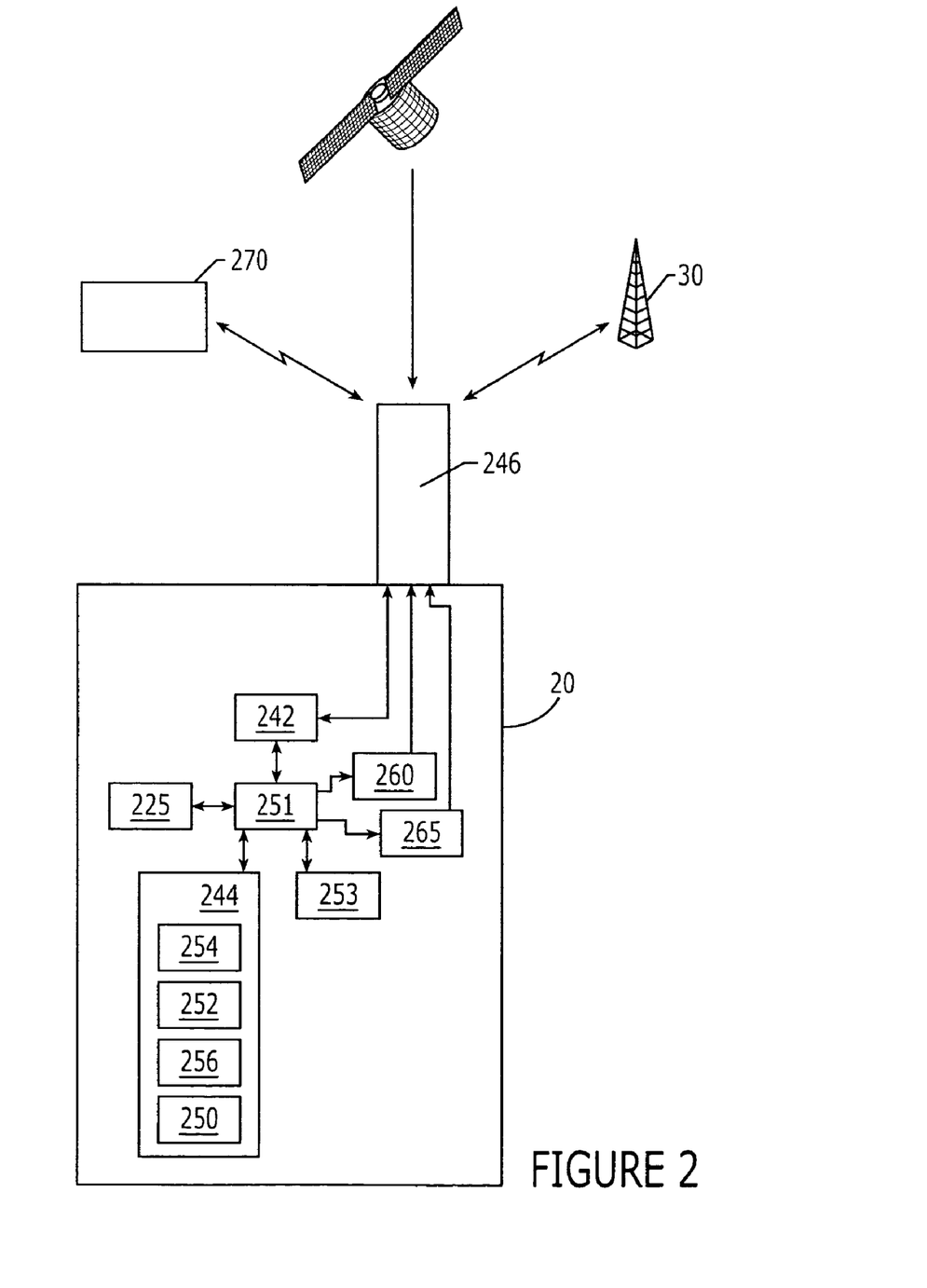
FIG. 2 is a block diagram that illustrates mobile terminals according to some embodiments of the invention.

FIG. 2 is a block diagram that illustrates a mobile terminal 20 according to some embodiments of the invention. According to some embodiments of the invention, mobile terminal density information is transmitted to the mobile terminal for display based on parameters reported by the mobile terminals. The mobile terminal density information may be a statistical representation of, for example, the number of mobile terminals estimated to be located within a geographic area at a particular time.

As illustrated in FIG. 2, the mobile terminal 20 includes a transceiver circuit 242 that is operative to transmit and receive radio frequency communication signals to the network 10 via an antenna system 246. The antenna system 246 may include an antenna feed structure and one or more antennas. As is well known to those of skill in the art, a transmitter portion of the transceiver 242 converts the information which is to be transmitted by the mobile terminal 20 into electromagnetic signals suitable for radio communications. A receiver portion of the transceiver 242 demodulates electromagnetic signals which are received by the mobile terminal 20 from the network 10 to provide the information contained in the signals in a format which is understandable to the user.

A user interface 244 of the mobile terminal 20 may include a variety of components, such as a display 254, a keypad 252, a speaker 256, and a microphone 250, operations of which are known to those of skill in the art. It will be understood that the functions of keypad 252 and the display 254 can be provided by a touch screen. The display may be used to provide images or graphics which the user can view, such as a map with a grid including collected parameters overlaid thereon, wherein the map represents a geographic area of interest to the user in a particular context, such as traveling to/from work, shopping, entertaining, or the like.

A processor circuit 251 provides for overall operation of the mobile terminal 20 including coordination of communications via the transceiver circuit 242, the user interface 244, and other components and systems included in the mobile terminal 20. For example, the processor circuit 251 can provide communications signals to the transceiver 242 when the user speaks into the microphone 250 and receives communications signals from the transceiver 242 for the reproduction of audio through the speaker 256. The processor circuit 251 can generate characters for display on the display 254. For example, the processor circuit 251 can generate numbers for display when the user enters a telephone number on the keypad 252. The characters can also be generated by a character generator circuit which is not shown.

The processor circuit 251 may be implemented using a variety of hardware and software. For example, operations of the processor circuit 251 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP).

The mobile terminal 20 includes a SIM card 225. The SIM card 225 can be installed (or removed) from the mobile terminal 20 by inserting (or removing) the SIM card 225 into/from a SIM card holder. The SIM card 225 stores information, such as an International Mobile Subscriber Identity (IMSI) that identifies the subscriber to the network 10 and a secret key for authentication. In some embodiments according to the invention, the IMSI includes a 3-digit Mobile Country Code (MCC) which identifies the country and a 2-digit Mobile Network Code (MNC) which identifies the network within that country. It will be understood that the SIM card 225 can store data, such as maps representing geographic areas in which the mobile terminal may be used and can be displayed thereon. The SIM card 225 can also store selectable contexts that can be used to process the parameter data The SIM card 225 can also store selectable context information that can be applied to the mobile terminal density information provided to the mobile terminal 20. For example, the SIM card 225 may store selectable context such as a shopping context, an entertainment context, a traveling context, etc. It will be also understood that the selectable contexts stored by the SIM card 225 may be further subdivided into subcontexts. For example, the traveling context, discussed herein in reference to FIG. 4, may be further subdivided into a commuting to work context and a commuting from work context. In this way, the contexts may be hierarchically/logically related to one another so that each selectable context may be easier to locate and apply.

In some embodiments according to the invention, the selectable context information can be stored in other types of internal or external non-volatile memory such as a Multi Media Card (MMC), a Secure Digital (SD) card, a Compact Flash (CF) card, a memory stick, and/or a Universal Serial Bus based non-volatile memory device.

It will be understood that the selectable contexts can indicate which of the mobile terminal density information is to be displayed and which of the mobile terminal density information may be suppressed to, for example, simplify the display of mobile terminal density information for the user. The processor circuit 251 can apply the mobile terminal density information to the selectable context to provide a geographic display (on the display 254) that is associated with the selectable context.

A memory 253 can store computer program instructions that, when executed by the processor circuit 251, carry out the operations described herein and shown in the figures. The memory 253 can be non-volatile memory, such as EEPROM (or flash memory), that retains the stored data while power is removed from the memory 253 to enable the storage of information, such as the WAP profile described above, to provide access to the network for the mobile terminal 20.

The mobile terminal 20 may also include a camera 226 that is configured to generate image data corresponding to images sampled by the camera 226. For example, the camera 226 can be used to capture an image and/or video that may be reported as a parameter as discussed herein so that mobile terminal density information may be based on content of the image.

The mobile terminal 20 shown in FIG. 2 also includes a geographic location circuit 260 that is configured to determine the geographic location of the mobile terminal using, for example, conventional GPS approaches (assisted or otherwise) known to those skilled in the art. It will be further understood that the geographic location circuit 260 can use other techniques to determine the mobile terminal geographic location information provided to the location server 135. As described herein, the mobile terminal geographic location information determined by the geographic location circuit 260 can be transmitted as a parameter on which the mobile terminal density information can be based.

The mobile terminal 20 also includes a local wireless interface circuit 265 that can provide communication with the local wireless networks and devices associated therewith. In some embodiments according to the invention, the local wireless interface circuit 265 is a Bluetooth compliant interface. In some embodiments according to the invention, the local wireless interface circuit 265 is a WLAN compliant interface.

The mobile terminal 20 can report parameters collected by the mobile terminal 20 to the network 10 via, for example, the base station 30. Some of the parameters that can be collected by the mobile terminal 20 include the geographic location of the mobile terminal, the velocity of the mobile terminal 20, an audio level sampled by the mobile terminal 20, image/video data, device type tag, and/or connectivity to other mobile terminals in the area. For example, the microphone 250 can be used to sample the ambient audio level in the local environment to provide the audio level parameter. The audio level parameter may be used to determine (at least in part) environmental parameters near the mobile terminal 20. A high audio level may indicate, for example, traffic congestion, construction, and other situations which may indicate higher or lower densities than may otherwise be evident. If the mobile terminal 20 samples an unusually high level of audio, it may be determined that there is an increased likelihood of congestion even though relatively few mobile terminals have been otherwise detected. In some embodiments according to the invention, the speaker 256 can be used to sample the ambient audio level in the local environment to provide the audio level parameter.

The device type tag parameter can indicate the type of device that is reporting the parameters. The device type tag can include, for example, car (i.e., where the device is integrated into a car), personal digital assistant, laptop, cellphone, or the like. In some embodiments according to the invention, the device type tag parameter can change as the use or configuration of the device changes. For example, a cellphone device type tag may change (or be further defined) from "cellphone" to "cellphone/car" when the cellphone is connected to an auxiliary power outlet in a car.

The connectivity parameter may indicate the presence of other mobile terminals in the area which may not be suitably equipped with geographic location circuits or may not participate in the same communications network. Accordingly, the presence of these otherwise undetected mobile terminals may be considered in determining mobile terminal density information. The connectivity parameter may be collected by the mobile terminal 20 using the local wireless interface circuit 265 that can detect, for example, the presence of a mobile terminal 270 within range of the local wireless interface circuit 265. It will be understood that the connectivity parameter can be further defined using the device type tag parameters described above. For example, each of the other mobile terminals in the area that are in communication with the mobile terminal 20 reporting the parameters can have an associated device type tag parameter so that when the connectivity parameter is reported, the system can further define what types of terminals are local to the mobile terminal 20 (which may be used to provide more accurate density information).

In some embodiments according to the invention, the connectivity parameter may also specify a geographical location that the mobile terminal 20 retrieved from another device, such as the mobile terminal 270, if for example, the mobile terminal 20 is not itself equipped with a geographic location circuit or is temporarily unable to determine it's own position using a geographic location circuit.

Figure 3A:
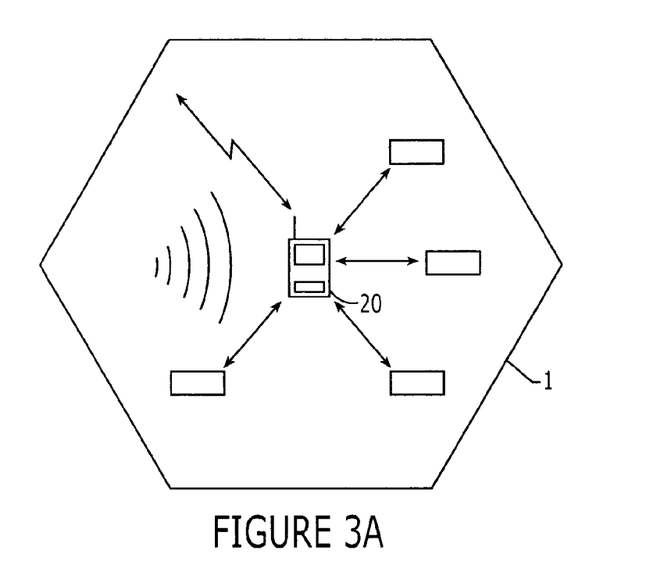
FIG. 3A is a schematic diagram that illustrates parameters collected reported by mobile terminals according to some embodiments of the invention.

FIG. 3A is a schematic diagram that illustrates the collection of parameters that may be used to determine mobile terminal density information according to some embodiments of the invention. In particular, the mobile terminal 20 can collect connectivity information based on a number of other mobile terminals brought within range of the local wireless interface discussed above in reference to FIG. 2. Furthermore, the mobile terminal 20 may sample the ambient audio level to provide the audio level parameter which may also be used in determining the mobile terminal density information.

It will be understood that the parameters collected by the mobile terminal 20 may be weighted based on the type of parameter which is collected or based on which other types of parameters are collected and/or how many mobile terminals are currently providing parameters within a particular geographic area. For example, the audio level parameter may be weighted comparatively less than location information reported by the mobile terminal 20 whereas the connectivity parameter may be weighted more than the audio level parameter but less than the location information reported by the mobile terminal.

Figure 3B:
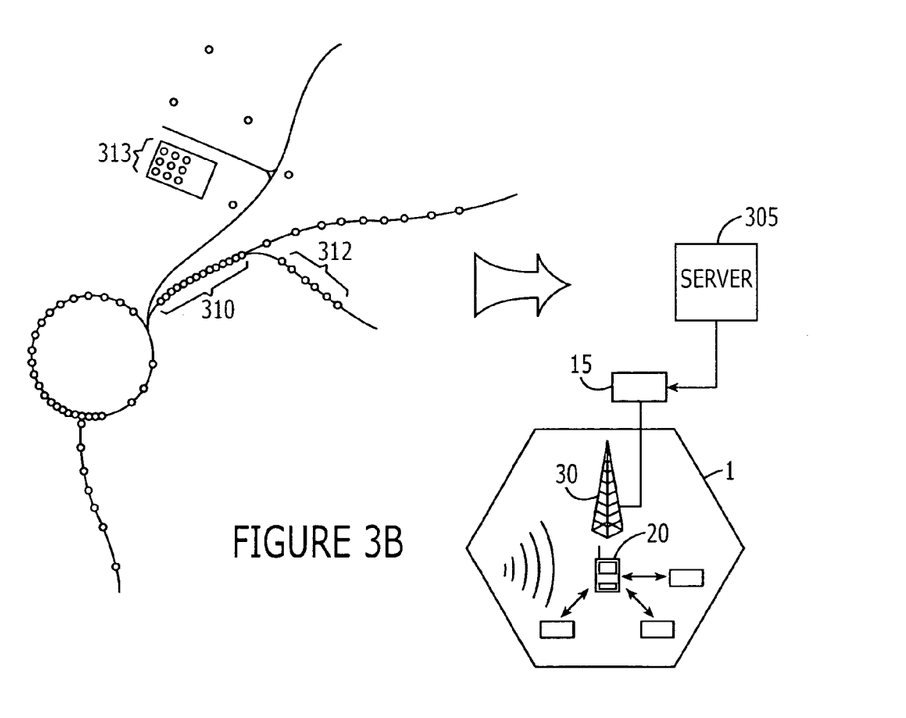
FIG. 3B is a schematic diagram that illustrates a mobile terminal density system according to some embodiments of the invention.

FIG. 3B is a schematic illustration depicting mobile terminals operating in a geographic area serviced by the network 10. According to FIG. 3B, mobile terminals 20 are shown at various positions within the geographic area including located on or at roadways, shopping areas, entertainment areas and other areas. The number of mobile terminals 20, as well as the spacings thereof, depicts the density of mobile terminals in the specific areas. For example, a first area 310 is relatively densely populated with mobile terminals 20 whereas a second area 312 is less densely populated with mobile terminals 20. A third area 313 includes an entertainment/shopping area populated by mobile terminals 20, which may be moving more slowly than those shown in the first and second areas 312 and 313 (or may even be stationary).

According to some embodiments of the invention, mobile terminals 20 report parameters to a mobile terminal density information server (hereinafter the "server") 305. It will be understood that the reporting of the parameters by the mobile terminals 20 can be done in an ad-hoc fashion wherein no request is required from the server 305 for the individual mobile terminals 20 to report parameters. It will be further understood that the reporting may be done in other ways, such as, using a synchronous type approach wherein mobile terminals 20 report at pre-assigned times or in response to a specific request from the server 305. It will be further understood that the server 305 may be directly connected to the network 10 or, alternatively, it may be indirectly coupled to the network 10 via a separate network, such as the Internet. In such embodiments where the server 305 is indirectly coupled to the network 10, the mobile terminal may report parameters via other networks, such as a WLAN, a Bluetooth network, etc.

The server 305 receives the parameters from the mobile terminals 20 and compiles the parameters to provide the mobile terminal density information. As described above, the mobile terminal density information may be based upon various parameters reported by the mobile terminals such as geographic location, connectivity, velocity, image data, audio level, and other parameters. Furthermore, the parameters may be weighted differently in determining the mobile terminal density information to provide an overall more accurate indication of the density information for the user. For example, as described above, connectivity information may be used in conjunction with geographic information reported by a mobile terminal 20 to increase an estimate of the number of, for example, people at a specific geographic location even though the devices connected to the mobile terminal 20 may not be in communication with the network 10 or may not be equipped with geographic location circuitry as described above.

The mobile terminal density information may be a statistical representation of, for example, the number of mobile terminals estimated to be located within a geographic area at a particular time. The statistical representation can be any type known to those skilled in the art, such as a moving average.

It will be further understood that the parameters compiled by the server 305 to provide the mobile terminal density information may be treated as "context independent" so that the information may be interpreted differently depending on circumstances so that the data integrity of the server 305 may be preserved. Further, a context may be applied to the information as part of the interpretation by, for example, a user at the mobile terminal. Accordingly, new types of parameters may be collected and reported without requiring major changes to the function of the server 305. It will be further understood that in some embodiments according to the invention, the selectable context may be applied based on a time of day such as during a morning commute or an afternoon commute wherein different contexts may be applied at the different times.

The server 305 transmits the mobile terminal density information to the mobile terminal 20 (via the mobile switching center 15) wherein the selectable context can be applied to the mobile terminal density information displayed thereon. It will be understood that the mobile terminal density information transmitted to the mobile terminal 20 can include only the mobile terminal density values. In still other embodiments according to the invention, the mobile terminal density information transmitted to the mobile terminal 20 can include a mobile terminal density value and a grid location to which the mobile terminal density value applies. Accordingly, the mobile terminal density information and the grid location may be overlaid on a map displayed by the mobile terminal 20 to convey, for example, congestion-related information which may be useful to the user in choosing a destination or a better route to a particular destination at a particular time.

As discussed above, the mobile terminal density information can be transmitted via a control channel on which the mobile terminal 20 is camping. Alternatively, in some embodiments according to the invention, the mobile terminal density information and grid locations may be transmitted using messages such as SMS or MMS formatted messages if the mobile terminal is so equipped. Alternatively, the information may be transmitted via a GPRS or other general purpose data channel.

In some embodiments according to the invention, the mobile terminal density information transmitted from the server to the mobile terminal 20 may include color and opacity values that are based on the mobile terminal density information associated with a particular grid location. For example, a color value for a particular grid location may indicate an average velocity of mobile terminals located in a geographic area corresponding to the grid location. The opacity value may represent the density of mobile terminals located in the geographic area corresponding to the respective grid location.

The color and opacity values may be combined to render the grid location oil the display of the mobile terminal 20 to convey information regarding the rate of flow of traffic within that grid location as well as the density of traffic. For example, in some embodiments according to the invention, a red color value may indicate relatively low velocities in that grid location and a relatively opaque opacity value may indicate relatively high density of traffic. In contrast, a green color value may indicate relatively high velocity in that grid location and a relatively low opacity value may indicate relatively light traffic. In some embodiments according to the invention, the opacity value may be limited so that a maximum opacity value allows the underlying map on the display of the mobile terminal 20 to be viewed through the grid locations, even though the opacity is relatively high.

Figure 4:
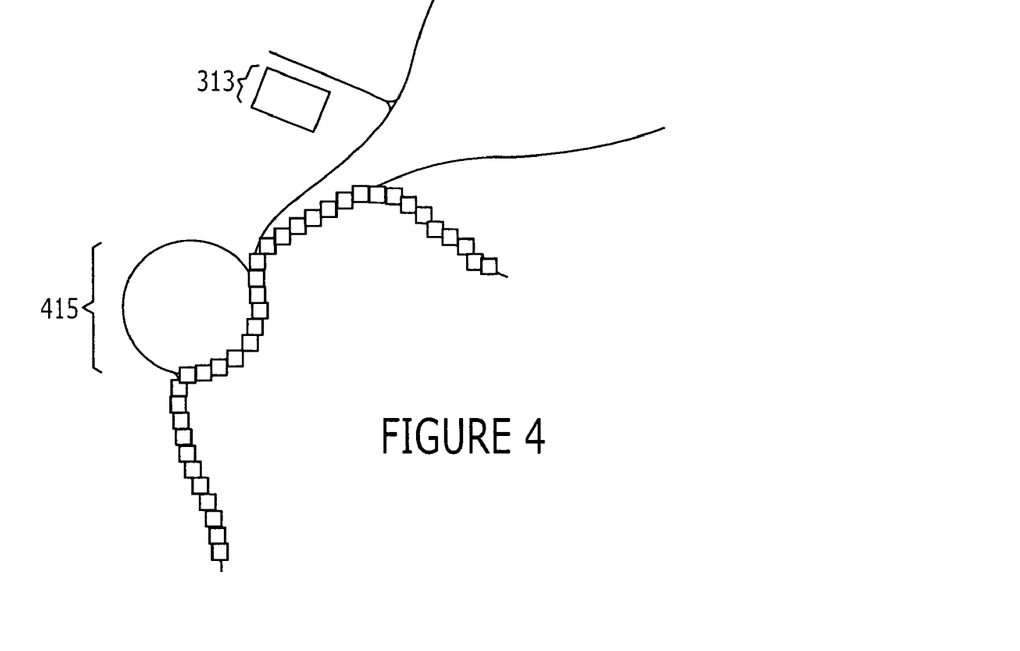
FIG. 4 is a schematic diagram that illustrates a geographic display on a mobile terminal according to some embodiments of the invention.

FIG. 4 is a schematic diagram illustrating display of mobile terminal density information according to some embodiments of the invention. In particular, mobile terminal density information shown in FIG. 4 is displayed on the mobile terminal 20 by the processor circuit 251 by applying the selectable context so that some of the mobile terminal density information is suppressed while other mobile terminal density information is not and, therefore, is displayed on the mobile terminal 20. In some embodiments according to the invention, the selectable context applied in FIG. 4 may be a sub-context of a traveling context, such as "commute to work context." In the "commute to work" subcontext, the user is known to follow a specific route from a residence to an office.

Accordingly, the mobile terminal density information corresponding to grid locations outside the predetermined route can be suppressed. For example, as shown in FIG. 4, mobile terminal density information corresponding to grid locations on area 313 in FIG. 3B can be suppressed. Similarly, an area 415 corresponding to a highway not typically traveled by the user from the residence to the office is also suppressed. It will be further understood that the selectable context may be automatically selected and applied to the mobile terminal density information based on, a week-day time of day such as Monday through Friday in the morning. Alternatively, this selectable context may be manually selected by the user. In still further embodiments according to the invention, the selectable context may be automatically selected based upon the geographic location of the mobile terminal 20 as the user moves through the region serviced by the network 10.

Figure 5:
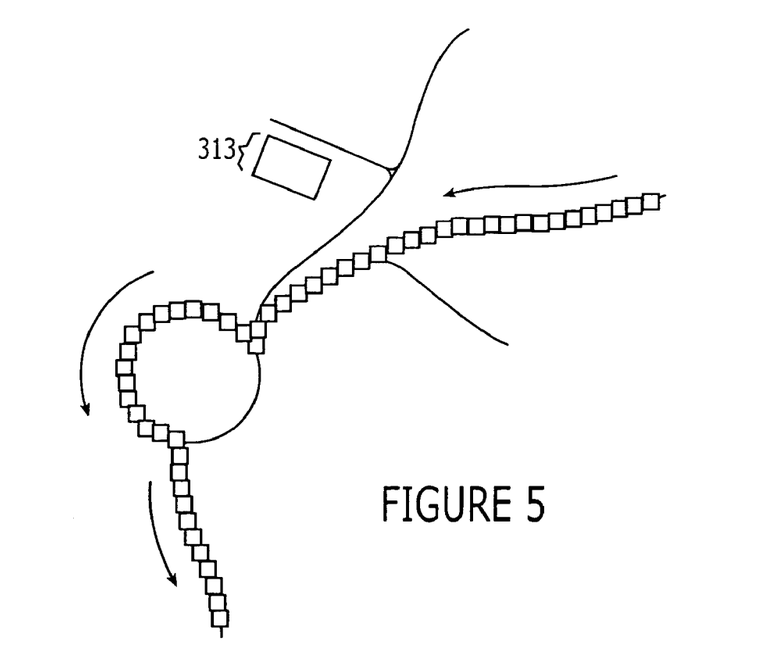
FIG. 5 is a schematic diagram that illustrates a geographic display on a mobile terminal according to some embodiments of the invention.

FIG. 5 is a schematic diagram illustrating the application of the selectable context to mobile terminal density information according to some embodiments of the invention. In particular, the selectable context applied in FIG. 5 may be referred to, in contrast to the context applied in FIG. 4, a "commute to home" context. In the "commute to home" context, portions of the mobile terminal density information corresponding to grid locations on roadways not typically traveled by the user can be suppressed. It will be further understood that the device type tag associated with the reporting mobile terminal may be used in the "commute to home" context to determine whether the density information should be displayed or suppressed. For example, a "car" device type tag associated with the reporting mobile terminal may be relevant to a display in this context while density information associated with a "cellphone" device type tag is suppressed.

Figure 6A:
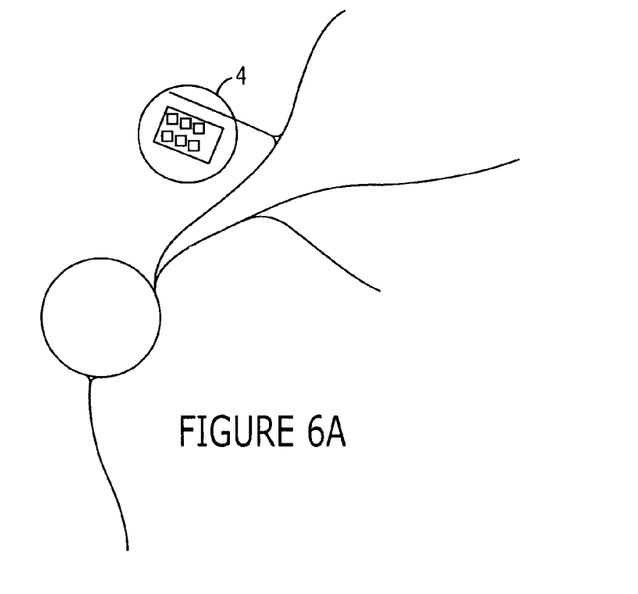
FIG. 6A is a schematic diagram that illustrates a geographic display on a mobile terminal according to some embodiments of the invention.

FIG. 6A is a schematic diagram that illustrates the application of a selectable context to mobile terminal density information according to some embodiments of the invention. In particular, FIG. 6A illustrates the application of a selectable context that may be referred to as an "entertainment/shopping" context. In particular, as shown in FIG. 6A, mobile terminal density information normally associated with the "commuting" contexts as shown in FIGS. 4 and 5, can be suppressed whereas mobile terminal density information associated with other geographic areas known to be related to entertainment and shopping can be displayed on the mobile terminal 20.

Figure 6B:
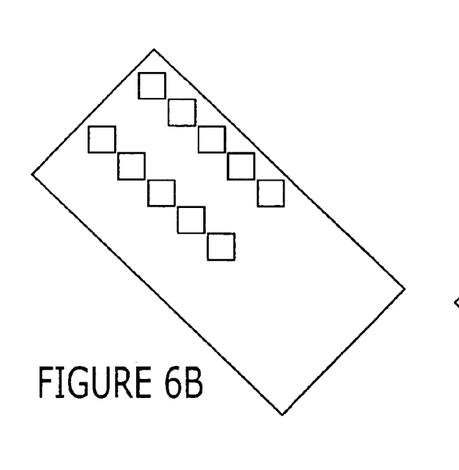
FIG. 6B is an enlarged view of a portion of FIG. 6A that illustrates a display of some mobile terminal density information according to a selectable context.
Figure 6C:
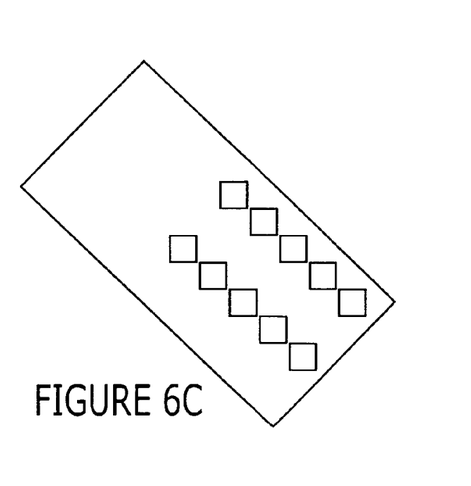
FIG. 6C is an enlarged view of a portion of FIG. 6A that illustrates a display of some mobile terminal density information according to a selectable context.

FIG. 6B is an enlarged view of portion A in FIG. 6A, wherein mobile terminal density information for a geographic area known to be associated with entertainment is displayed on the mobile terminal 20 whereas mobile terminal density information known to be associated with shopping is suppressed. In contrast, FIG. 6C is an enlarged view of portion A in FIG. 6A having a shopping context applied thereto so that mobile terminal information associated with shopping is displayed and the mobile terminal information associated with entertainment is suppressed.

In still further embodiments according to the invention, a context referred to herein as "crowding" can be applied to the density information so that density information associated with mobile terminals unrelated to crowds can be suppressed whereas density information associated with crowds or crowding can be displayed. For example, in some embodiments according to the invention, a user may wish to find a local beach or entertainment area that is more popular than others. The user may thereby apply the crowding context to generate a display on the mobile terminal of mobile terminal density information reflecting a level of crowding associated with different geographic locations. It will also be understood that the device type tag parameter can be used to determine whether the mobile density information associated with a reporting mobile terminal should be suppressed or displayed based on the type of device identified by the device type tag.

For example, a "cell phone" device type tag may be relevant to a display of mobile terminal density information in the crowding context, whereas a "car" device type tag may not be relevant. Accordingly, any mobile terminal density information associated with a car device type tag may be suppressed while mobile terminal density information associated with the cell phone device type tag may be displayed. In further embodiments according to the invention, the device type tag may be applied in a "parking" context wherein, for example, device type tags associated with cars are displayed, whereas mobile terminal density information reported by mobile terminals having other type tags can be suppressed. Therefore, a user may more efficiently locate areas where parking may be more available, or alternatively, may avoid areas in which parking is less likely to be available.

Figure 7:
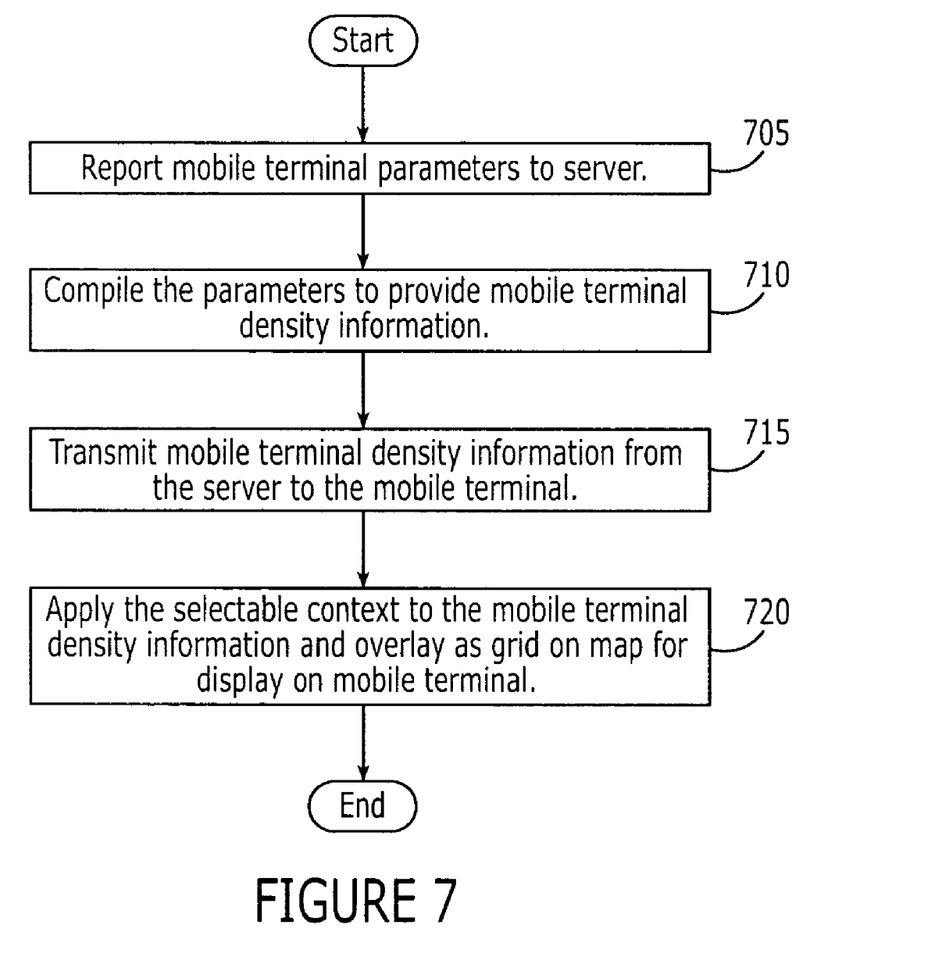
FIG. 7 is a flow chart that illustrates operations of mobile terminals according to some embodiments of the invention.

According to FIG. 7, mobile terminal parameters are reported by the mobile terminals and received at a server using, for example, an ad-hoc reporting mechanism (block 705). As discussed above, the parameters can include geographical location information, velocity information, connectivity information, audio level information, device type tag, etc. The server compiles the parameter to provide mobile terminal density information (block 710). The mobile terminal density information can be compiled by weighting some of the parameters more or less than other parameters. For example, connectivity parameter information may indicate other mobile terminals that are near the reporting mobile terminal and therefore may indicate increased density, which may otherwise may not be evident as those other mobile terminals may not operate within the wireless communications network.

In some embodiments according to the invention, velocity information reported by the mobile terminals may be used to indirectly determine an indication of the mobile terminal density information. For example, velocity may be considered to be inversely proportional to density such that a relatively high velocity value associated with a geographic location may indicate relatively low density information for the reporting mobile terminal. On the other hand, a relatively low velocity value associated with a geographic location may indicate relatively high density information for the reporting mobile terminal.

The parameters would be collected and associated with geographic locations that correspond to grid locations (i, j) that will ultimately be rendered (as the density information) on the display of the mobile terminal. It will be understood that the grid locations (i, j) associated with the compiled parameters correspond to a geographic area within the network that is large enough to cover an area sufficient to represent an adequate number of reports from the mobile terminals. It will be further understood that the geographic areas corresponding to the grid locations (i, j) should also be small enough to provide relatively fine detail regarding the mobile terminal density information that is ultimately displayed. It will be understood that the grid locations (i, j) can be uniform or vary in size based on, for example, how many parameters are reported from each grid locations (i, j).

In some embodiments according to the invention, the geographic location information and velocity parameters reported by the mobile terminals are associated with a particular grid location to be displayed. For example, velocity parameters can be compiled for a particular grid location as a moving average over time using the following equations:

$$\text{velocity}_{i,j} \leftarrow c \cdot \text{velocity} + (1-c) \cdot \text{velocity}_{i,j}$$

$$n_{i,j} \leftarrow n_{i,j} + 1$$

where c=1/m, and m is the number of velocity values to include in the moving average. To avoid saturating a velocity value at a particular grid location over time, the reading-count may be degraded over time by, for example, reducing the value by a certain percentage of regular time intervals. Although the above referenced equations are described with reference to compilation of velocity information, it will be understood that the same or analogous types of processing may be used to compile other parameters reported by the mobile terminals. It will be further understood that if the mobile terminal is equipped with a geographic location circuit, such as a GPS, an altitude information parameter may also be included so that a three-dimensional representation may be rendered for the two-dimensional display of the mobile terminal, wherein the rendered third dimension may represent density information as a function of altitude.

The mobile terminal density information is transmitted to the mobile terminal (block 715). As discussed herein, the mobile terminal density information may include its statistical representation of the density (such as a moving average) and may further include opacity values which can be used to render locations on a grid that are overlaid on a map shown on the display of the mobile terminal. The density information can be transmitted in a Scaleable Vector Graphic (SVG) format. As is well understood by those skilled in the art, SVG is a language for describing two-dimensional graphics and graphical applications in XML. SVG 1.1 is a current W3C Recommendation and forms the core of the current SVG developments which is intended for resource-limited devices such as 3GPP platform third generation mobile phones. The selectable context is applied to the mobile terminal density information and overlaid as a grid on a map for display on mobile (block 720).

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A method of providing information on a mobile terminal comprising:
    displaying mobile terminal density information on a mobile terminal display according to a selectable context based on parameters reported by mobile terminals operating in a wireless communications network to a server, the method further comprising:
    applying the mobile terminal density information to the selectable context to generate a geographic display associated with the contex, wherein the geographic display associated with the context comprises a map and a plurality of grid of locations overlaid thereon;
    wherein the density information further comprises velocity information associated with the mobile terminals; and
    wherein selected ones of the plurality of grid of locations are rendered with color and opacity values based on mobile terminal density information associated with the selected ones of the plurality of grid locations.

2. A method according to claim 1 further comprising:
    receiving the parameters from the mobile terminals at the server via ad-hoc reporting of the mobile terminals;
    compiling the parameters to provide the mobile terminal density information; and
    transmitting the mobile terminal density information to the mobile terminal for display.

3. A method according to claim 1 wherein a maximum opacity value is less than an opaque value so that the underlying map is visible through the plurality of grid locations overlaid thereon at the maximum opacity value.

4. A method according to claim 1 wherein the color values comprise a statistical representation of velocity of mobile terminals located in a geographic area serviced by the wireless communications network corresponding to respective grid locations.

5. A method according to claim 1 wherein the opacity values comprise a statistical representation of a density of mobile terminals located in a geographic area serviced by the wireless communications network corresponding to respective grid locations.

6. A method according to claim 1 wherein the selectable context comprises a first selectable context selected from a plurality of selectable contexts, wherein some of the mobile terminal density information is suppressed according to the first selectable context and not suppressed according to a second selectable context.

7. A method according to claim 1 wherein the selectable context comprises a shopping context, a commuting context, and/or an entertainment context.

8. A method according to claim 7 wherein the selectable context comprises a sub-context.

9. A method according to claim 1 carried out by a computer program product embodied in a computer readable medium executable by a processor.

10. A method according to claim 1 carried out by a system comprising:
    a means for displaying mobile terminal density information on a mobile terminal display according to a selectable context based on parameters reported by mobile terminals operating in a wireless communications network to server.

11. A method according to claim 1 wherein the parameters comprise location information, velocity information, connectivity information, image information, and/or audio information.

12. A mobile terminal comprising:
    a transceiver circuit configured to transmit/receive communications to/from a wireless communications network that provides service to the mobile terminal including parameters received from a server reported by mobile terminals operating in the wireless communications network to the server;
    a processor circuit, coupled to the transceiver, configured to provide mobile terminal density information according to a selectable context based on the parameters received from the server;
    a display, coupled to the processor circuit, configured to display the mobile terminal density information based on the parameters;
    wherein the processor circuit is further configured to provide a geographic display including the mobile terminal density information associated with the context;
    wherein the geographic display comprises a map and a plurality of grid of locations overlaid thereon;
    wherein the density information further comprises velocity information associated with the mobile terminals; and wherein selected ones of the plurality of grid locations are rendered with color and opacity values based on mobile terminal density information associated with the selected ones of the plurality of grid locations.

13. A mobile terminal according to claim 12 wherein the parameters comprise location information, velocity information, connectivity information, and/or audio information.

14. A mobile terminal according to claim 13 wherein the connectivity information comprises a value associated with a number of other devices in communication with the mobile terminal over a channel other than that used to transmit the parameters.

15. A mobile terminal according to claim 13 wherein the velocity information is used as an inversely proportional indicator of the mobile terminal density information.

16. A mobile terminal according to claim 12 wherein a maximum opacity value is less than an opaque value so that the underlying map is visible through the plurality of grid locations overlaid thereon at the maximum opacity value.

17. A mobile terminal according to 12 wherein the color values comprise a statistical representation of velocity of mobile terminals located in a geographic area serviced by the wireless communications network corresponding to respective grid locations.

18. A mobile terminal according to claim 12 wherein the opacity values comprise a statistical representation of a density of mobile terminals located in a geographic area serviced by the wireless communications network corresponding to respective grid locations.

19. A mobile terminal according to claim 12 wherein the selectable context comprises a first selectable context selected from a plurality of selectable contexts, wherein some of the mobile terminal density information is suppressed according to the first selectable context and not suppressed according to a second selectable context.

20. A mobile terminal according to claim 12 wherein the selectable context comprises shopping, commuting, crowding, parking, entertaining, and/or working.

* * * * *